UNITED STATES PATENT OFFICE 2,026,861

PYRAZOLONE AZO DYES AND THEIR PRODUCTION

Walther Benade, Dessau in Anhalt, Germany, assignor to General Aniline Works, Inc., New York, N. Y., a corporation of Delaware No Drawing. Application September 26, 1933, Serial No. 691,083. In Germany December 7, 1932

6 Claims. (Cl. 260—44.6)

My present invention relates to a process of manufacturing new azo dyes, to the new products obtainable by this process, and to a process for dyeing wool with these dyes in the presence of a chromium mordant.

According to this invention, valuable dyes suitable for dyeing wool with the aid of a chromium mordant by the single bath process are made by diazotizing a 2-amio-1-hydroxybenzene containing a negative substituent, such as the nitro group or a halogen containing, however, neither a sulfonic acid nor a carboxylic acid group, and coupling the diazo compound with a monosulfonic acid of the 1-(1'- or 2'-naphthyl)-3-methyl-5-pyrazolones.

These new dyes correspond to the general formula:

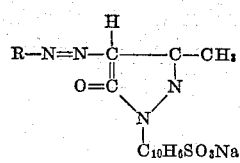

wherein R is a benzene radicle substituted by at least one negative substituent but containing neither an —$SO_3H$ nor a COOH radicle, and wherein the radicle of the naphthalene monosulfonic acid is bound to the pyrazolone radicle either in α- or β-position.

The dyes obtained according to this invention are distinguished by their solubility in water and their good affinity for wool. They yield, when dyed on wool, according to the single bath process in the presence of a chromium mordant orange to red tints having a good fastness to fulling and washing and an excellent fastness to light. The manufacture of ortho-hydroxyazo dyes with the aid of naphthylmethyl pyrazolones, free from sulfonic acid groups, as azo compound, is known. However, the manufacture on a large scale fails on account of the fact that the parent materials for the pyrazolones, i. e., the unsulfonated naphthylhydrazines, could not be manufactured in great batches (cf. Berichte der deutschen Chemischen Gesellschaft 17, page 572, and Liebigs Annalen 252, page 236).

The following examples illustrates the invention, the parts being by weight:—

Example 1.—18.9 parts of 4-nitro-6-chloro-2-amino-1-hydroxybenzene are suspended in 200 parts of water and diazotized by addition of 25 parts of hydrochloric acid 12° Bé. and 6.9 parts of sodium nitrite. The diazo compound thus obtained, is allowed to run into a solution of 31 parts of 1-(2'-naphthyl)-3-methyl-5-pyrazolone-6'-sulfonic acid of the formula

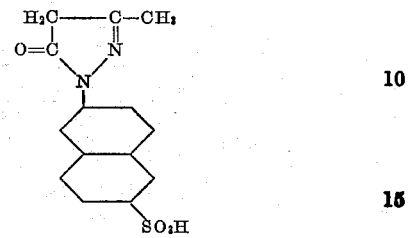

and 25 parts of sodium carbonate in 1000 parts of water cooled with ice. When the reaction has finished, the mass is warmed to 60° C. after addition of 150 parts of common salt. The separated dye forms, when dry, a brown powder which is easily soluble in water and dyes wool orange tints without necessity of preliminary mordanting or after-treatment when carrying out the chromium mordanting and dyeing process according to the single bath process. The shades thus obtained, have a good fastness to milling and washing and an excellent fastness to light.

Example 2.—The diazo compound prepared from 18.9 parts of 4-chloro-5-nitro-2-amino-1-hydroxybenzene, 6.9 parts of sodium nitrite and 25 parts of hydrochloric acid (12° Bé.) is added to a cold solution of 31 parts of 1-(2'-naphthyl)-3-methyl-5-pyrazolone-8'-sulfonic acid of the formula

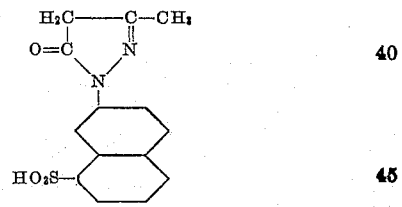

and 25 parts of sodium carbonate in about 1500 parts of water. The dye formed is worked up as usual. It forms in the dry state a dark powder which dissolves in water to a red solution and dyes wool according to the chromium mordanting single bath process garnet shades of good fastness to milling and washing.

*Example 3.*—Into a solution of 31 parts of 1-(1'-naphthyl)-3-methyl-5-pyrazolone-4'-sulfonic acid of the formula

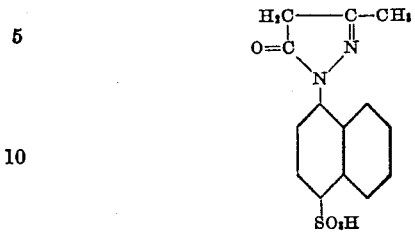

and 25 parts of sodium carbonate in about 1000 parts of water the diazo compound is introduced which is obtained from 21.3 parts of 3,4,6-trichloro-2-amino-1-hydroxybenzene, 6.9 parts of sodium nitrite and 25 parts of hydrochloric acid (12° Bé.) in about 500 parts of water. When coupling is complete, the dye is separated by addition of common salt and worked up in known manner. When dry, it is a red brown powder which dissolves in water to a red yellow solution and which dyes wool by the single bath chrome process red orange tints of good fastness.

*Example 4.*—17.8 parts of 4,6-dichloro-2-amino-1-hydroxybenzene are diazotized with 6.9 parts of sodium nitrite and 25 parts of hydrochloric acid (12° Bé.) and combined with 31 parts of 1-(2'-naphthyl)-3-methyl-5-pyrazolone-5'-sulfonic acid of the formula

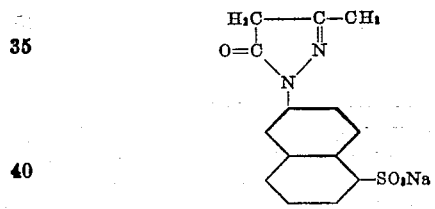

in a solution which is alkaline by the presence of soda. The separated and dried dye dissolves in water to a red solution and dyes wool clear red tints of good fastness to washing and fulling.

It is obvious that my invention is not limited to the foregoing example or to the specific details given therein. Other diazo components than those mentioned in the examples such as, for instance, tetrachlor-1-hydroxy-2-aminobenzene, nitrotrichloro-1-hydroxy-2-aminobenzene or the alkyl substitution products of the aminophenols used according to the examples may likewise be coupled with a naphthyl pyrazolone monosulfonic acid; the latter may be any α- or β-naphthylpyrazolone substituted in the naphthalene radicle by an —SO₃H group.

What I claim is:—

1. The azo dyes corresponding to the general formula

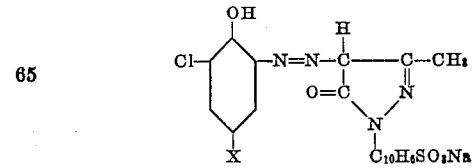

wherein $x$ means hydrogen, alkyl, —NO₂ or chlorine, said dyes forming in the dry state dark powders soluble in water and dyeing wool according to the single bath process in the presence of a chrome mordant orange to red tints having a good fastness for washing and fulling and a very good fastness to the action of light.

2. The azo dyes corresponding to the general formula

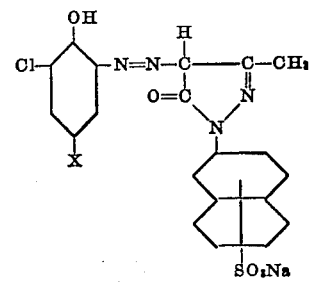

wherein x means hydrogen, alkyl, —NO₂ or chlorine, said dyes forming in the dry state dark powders soluble in water and dyeing wool according to the single bath process in the presence of a chrome mordant orange to red tints having a good fastness for washing and fulling and a very good fastness to the action of light.

3. The azo dyes corresponding to the general formula

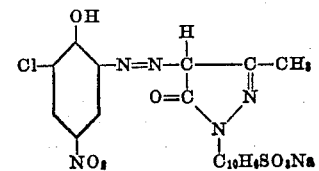

said dyes forming in the dry state dark powders soluble in water and dyeing wool according to the single bath process in the presence of a chrome mordant orange to red tints having a good fastness for washing and fulling and a very good fastness to the action of light.

4. The azo dyes corresponding to the general formula

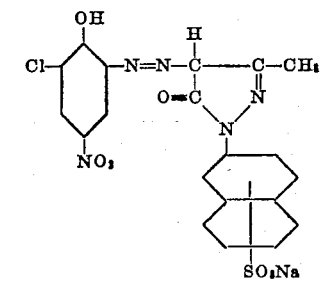

said dyes forming in the dry state dark powders soluble in water and dyeing wool according to the single bath process in the presence of a chrome mordant orange to red tints having a good fastness for washing and fulling and a very good fastness to the action of light.

5. The azo dye corresponding to the general formula

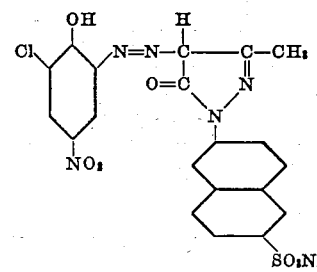

forming, when dry, a brown powder which is easily soluble in water and dyes wool in the presence of a chromium mordant orange tints of good fastness to milling and washing and excellent fastness to light.

6. The process which comprises diazotizing 4-nitro-6-chloro-2-amino-1-hydroxybenzene and coupling the diazo compound with 1-(2'-naphthyl-6'-sulfo)-3-methyl-5-pyrazolone.

WALTHER BENADE.